United States Patent
Verbeque

(10) Patent No.: US 7,305,147 B2
(45) Date of Patent: Dec. 4, 2007

(54) ZOOMING METHOD

(75) Inventor: Jean-René Verbeque, Lardy (FR)

(73) Assignee: Thales, Neuilly-sur-Seine (FR)

( * ) Notice: Subject to any disclaimer, the term of this patent is extended or adjusted under 35 U.S.C. 154(b) by 778 days.

(21) Appl. No.: 10/480,154

(22) PCT Filed: Jun. 4, 2002

(86) PCT No.: PCT/FR02/01899

§ 371 (c)(1),
(2), (4) Date: Dec. 10, 2003

(87) PCT Pub. No.: WO03/003298

PCT Pub. Date: Jan. 9, 2003

(65) Prior Publication Data

US 2004/0156560 A1    Aug. 12, 2004

(30) Foreign Application Priority Data

Jun. 29, 2001    (FR) .................................. 01 08674

(51) Int. Cl.
*G06K 9/32* (2006.01)
*G06K 9/00* (2006.01)
*G09G 5/00* (2006.01)

(52) U.S. Cl. ...................... 382/298; 382/113; 382/293; 382/299; 345/582

(58) Field of Classification Search ................ 382/298, 382/299, 293, 154; 345/521, 427
See application file for complete search history.

(56) References Cited

U.S. PATENT DOCUMENTS 4,551,724 A * 11/1985 Goldstein et al. ......... 342/25 C
4,821,212 A    4/1989 Heartz (Continued)

FOREIGN PATENT DOCUMENTS

EP    0 434 037 A    6/1991

(Continued)

OTHER PUBLICATIONS

Stewart J., "Fast Horizon Computation at All Points of a Terrain With Visibility and Shading Applications", IEEE Transactions on Visualization and Computer Graphics, vol. 4, No. 1, Jan.-Mar. 1999, pp. 82-93.*

(Continued)

*Primary Examiner*—Jingge Wu
*Assistant Examiner*—Jose M Torres
(74) *Attorney, Agent, or Firm*—Lowe Hauptman Ham & Berner, LLP

(57) ABSTRACT

The invention relates to the field of methods for zooming onto a part of an image which consists of pixels and which represents a terrain overflown by an aircraft. It is a zoom method for zooming onto a part of an image which consists of pixels and which represents a terrain overflown by an aircraft, an image being modulated, pixel by pixel, by a shading cue representative of the relief of a terrain. The shading cue is determined by way of a computation carried out, in a reference frame of a display screen of an aircraft, pixel by pixel, on the basis of the altitudes of pixels neighboring the current pixel in the case of the unzoomed image. The method according to the invention can in particular be implemented in a cartographic accelerator card.

18 Claims, 3 Drawing Sheets

U.S. PATENT DOCUMENTS 4,940,972 A * 7/1990 Mouchot et al. ............ 345/421
5,086,396 A * 2/1992 Waruszewski, Jr. ......... 701/221
5,550,959 A * 8/1996 Freeman .................... 345/427

FOREIGN PATENT DOCUMENTS

| EP | 0 774 748 A | 5/1997 |
|---|---|---|
| FR | 0202262 | 6/2002 |
| WO | 95 19546 | 7/1995 |

OTHER PUBLICATIONS

Baumann et al., "A Hybrid, Hierarchical Data Structure for Real-Time Terrain Visualization", IEEE Internations Proceedings of Computer Graphics, Jun. 7-11, 1999, pp. 85-92.*

* cited by examiner

ZOOMING METHOD

CROSS-REFERENCE TO RELATED APPLICATIONS

The present Application is based on International Application No. PCT/FR02/01899, filed on Jun. 4, 2002 which in turn corresponds to France Application No. 0108674 filed on Jun. 29, 2001 and priority is hereby claimed under 35 USC §119 based on these applications. Each of these applications are hereby incorporated by reference in their entirety into the present application.

BACKGROUND OF THE INVENTION

1. Field of the Invention

The invention relates to the field of methods for zooming onto a part of an image which consists of pixels and which represents a terrain overflown by an aircraft. The terrain overflown by the aircraft is either the terrain actually overflown by the aircraft when the image is displayed, or the terrain which is intended to be overflown by the aircraft, the image then being displayed in anticipation. The zoom method is preferably carried out by certain functional blocks of a cartographic function of a cartographic accelerator card described in detail subsequently.

The image is in general a 2D5 cartographic image, that is to say one representing a terrain plan view which is modulated, pixel by pixel, by a shading cue representative of the terrain relief. The image may be an altimetric image or a planimetric image. This shading cue determines-the brightness of each pixel of the image considered. In the case of an unzoomed image, that is to say an image whose zoom factor equals one, this shading cue is determined by way of a computation which is carried out, in the reference frame of a display screen of the aircraft, pixel by pixel, on the basis of the altitudes of pixels neighboring the current pixel. These neighboring pixels are preferably pixels immediately neighboring the current pixel, that is to say the pixels closest to the current pixel from among the neighboring pixels. The shading cue is computed on the one hand on the basis of a model of illumination of the image using one or more light sources, point and/or diffuse, and on the other hand on the basis of the local slope at the level of the current pixel, that is to say each of the pixels of the image, this local slope being represented by the orientation of a facet at the level of the current pixel.

2. Description of Prior Art

According to the prior art, this computation can be undertaken according to several different techniques among which the most common are the technique of so-called "flat shading", the technique of so-called "gouraud shading", and the so-called "Phong" technique. All these techniques have in common the use of characteristics of the neighboring pixels, such as for example the orientation of the normals to the neighboring pixels for the so-called "gouraud shading" technique, to determine the orientation of the facet which represents the local slope at the level of the current pixel. These techniques give better or worse results depending on the technique, at the cost of greater or lesser complexibility in the implementation of said techniques. The results are generally correct for an unzoomed image. On the other hand, for a zoomed image, and especially for an image whose zoom factor becomes considerable, a facetization of the image referred to as "bathroom tiling" appears (except for the so-called "Phong" technique, but the latter is complex and expensive in terms of resources) which is an impediment to the pilot, especially in dynamic mode on account of the flashing which occurs at the boundary between the various "bathroom tiles" and on which the pilot's attention is focused.

SUMMARY OF THE INVENTION

The invention proposes a zoom method in which, in the case of the image zoomed with a given zoom factor, the zoom factor varying for example from one to eight, the zoom factor generally being continuous and the set of values of the zoom factor being separated into various zoom spans, the unit zoom factor belonging to the unit span for which the image is unzoomed, the shading cue is determined by way of the same computation as above, but this time this computation is not carried out on the basis of the altitudes of the pixels neighboring the current pixel, but on the basis of pixels that are more remote from the current pixel than the neighboring pixels, the remoteness factor which is a natural integer then belonging to the zoom span considered in such a way as to be the closest possible to the zoom considered. When the zoom factor considered is an integer, the value of the remoteness factor preferably becomes equal to the value of the zoom considered.

According to the invention, there is provided a zoom method for zooming onto a part of an image which consists of pixels and which represents a terrain overflown by an aircraft, the image being modulated, pixel by pixel, by a shading cue representative of the relief of the terrain, said shading cue being determined by way of a computation carried out, in the reference frame of a display screen of the aircraft, pixel by pixel, on the basis of the altitudes of pixels neighboring the current pixel in the case of the unzoomed image, characterized in that, in the case of the image zoomed with a zoom factor whose value belongs to a given span distinct from the span to which the unit zoom factor belongs, the latter corresponding to an unzoomed image, the shading cue is determined by way of said computation carried out on the basis of the altitudes of pixels which are more remote from the current pixel than the neighboring pixels, by a remoteness factor whose value belongs to said given span.

The computation considered determines the shading cue preferably on the basis of four pixels forming the vertices of a square whose current pixel is the center, the shading cue then being obtained on the basis on the one hand of the difference in altitude between the pixel situated at the top left of the current pixel and the pixel situated at the bottom right of the current pixel and on the other hand of the difference in altitude between the pixel situated at the top right of the current pixel and the pixel situated at the bottom left of the current pixel. These two altitude differences represent the local slopes of the facet at the level of the current pixel, along two mutually orthogonal directions. The number of pixels situated around the current pixel, adopted to determine the orientation of the facet at the level of the current pixel, is four, this representing a good compromise between the simplicity of the computation carried out and the realism of the image obtained at the level of the rendition of the relief of the terrain represented.

A saturation function is preferably applied to the result of each of said differences. This makes it possible to limit the number of bits required for the discrete representation of the values of these differences. Thus, the subsequent steps of the computation making it possible to obtain, at each pixel, the shading cue which is generally a shading coefficient intended to modulate the color of the current pixel are faster and require lesser resources in particular in terms of memory size.

Preferably, the shading cue is obtained directly by reading a lookup table termed the shading table which comprises two inputs. The lookup table operates very simply and very fast, giving results of satisfactory accuracy. One of the inputs receives the difference in altitude between the pixel situated at the top left of the current pixel and the pixel situated at the bottom right of the current pixel and the other input receives the difference in altitude between the pixel situated at the top right of the current pixel and the pixel situated at the bottom left of the current pixel. The values of this table, which is generally loaded by software, are advantageously recomputed on the one hand with each change of scale of the image and on the other hand with each change of the zoom, thereby making it possible to tailor the lookup table to the metric of the terrain represented, which metric determines in particular the maximum standard slopes that may be encountered on the terrain overflown by the aircraft. The values of the table may also be recomputed at other moments, but this is less necessary.

The number of bits for coding the altitude differences is preferably less than the number of bits for coding the altitudes, so as to limit the size of the shading table. The correspondence between the bits for coding the altitude differences and the bits for coding the altitudes is preferably variable so as to accommodate the variation in the altitude differences as a function of the variation in the remoteness of the pixels entering into the computation of said altitude differences. When the variation in the metric of the terrain represented causes a loss of detail regarding the relief of the terrain, this loss may thus be offset, at least in part, by an increase in contrast, that is to say by emphasizing the variations in the relief of the terrain. For example, when the value of the scale of the image is tending to decrease, the weight of the bit for coding the altitudes corresponding to the least significant bit of the coding of the altitude differences tends to increase. When the value of the scale of the image decreases substantially, that is to say passes below a predetermined threshold, the weight of the bit for coding the altitudes corresponding to the least significant bit of the coding of the altitude differences increases by one unit. Similarly, when the value of the zoom increases substantially, the weight of the bit for coding the altitudes corresponding to the least significant bit of the coding of the altitude differences preferably decreases.

In order to be able to carry out the altitude difference computations, the zoom method, in addition to the altitude of the current pixel, must be able to make use of the altitudes of the pixels which are situated around the current pixel and which are remote from the current pixel by a remoteness factor related to the zoom value considered. To do this, preferably, the zoom method uses the abutting succession of four queue stacks of specified lengths in such a way that the altitude of the pixel situated at the bottom right of the current pixel is available at the level of the input of the first queue stack, the altitude of the pixel situated at the bottom left of the current pixel is available between the output of the first queue stack and the input of the second queue stack, the altitude of the current pixel is available between the output of the second queue stack and the input of the third queue stack, the altitude of the pixel situated at the top right of the current pixel is available between the output of the third queue stack and the input of the fourth and last queue stack, the altitude of the pixel situated at the top left of the current pixel is available at the level of the output of the fourth and last queue stack.

BRIEF DESCRIPTION OF THE DRAWINGS

The invention will be better understood and other features and advantages will become apparent with the aid of the following description and of the appended drawings, given by way of examples, where.

MORE DETAILED DESCRIPTION

Figure 1:
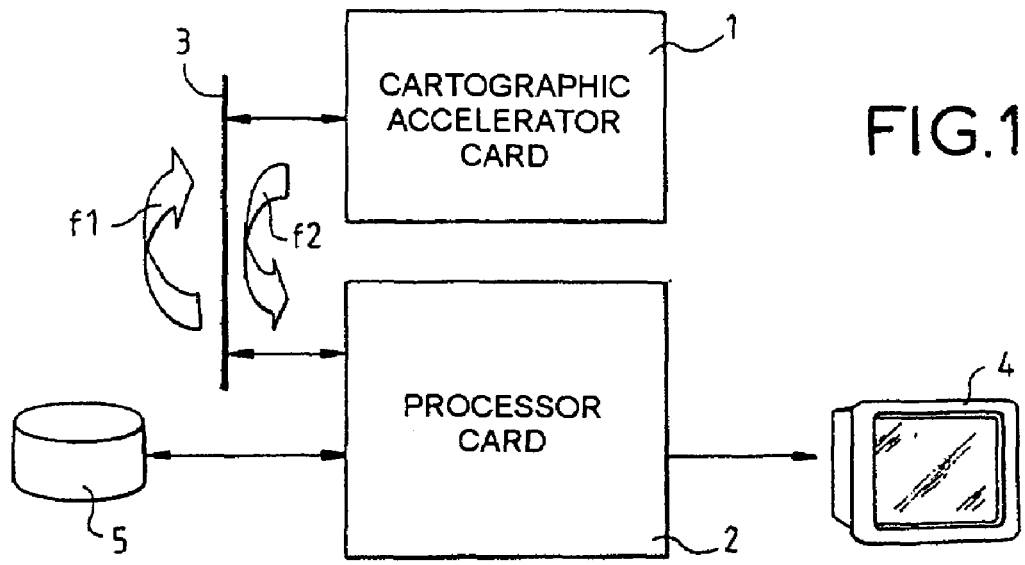
FIG. 1 diagrammatically represents a first exemplary cartographic system incorporating the cartographic accelerator card which implements the method according to the invention.

FIG. 1 diagrammatically represents a first exemplary cartographic system incorporating the cartographic accelerator card which implements the method according to the invention. The cartographic system comprises a cartographic accelerator card 1, a processor card 2, a bus 3, a display screen 4, a cartographic database 5. The bus 3 is preferably a PCI bus. The processor card 2 extracts cartographic data from the cartographic database 5 so as to group them together with parameters of the flight of the aircraft and parameters of the man-machine interface and place them on the bus 3 in a data stream f1. The cartographic accelerator card 1 reads the data of the stream f1 which travel over the bus 3. The cartographic accelerator card 1 uses the data of the stream f1 that are taken from the bus 3 to carry out the synthesis of a cartographic image. The cartographic accelerator card 1 dispatches the cartographic image over the bus 3 in a data stream f2. The processor card 2 reads from the bus 3 the cartographic image of the stream f2 so as to dispatch it to the display screen 4. The display screen 4 displays the cartographic image which can thus be viewed by the pilot of the aircraft for example.

Figure 2:
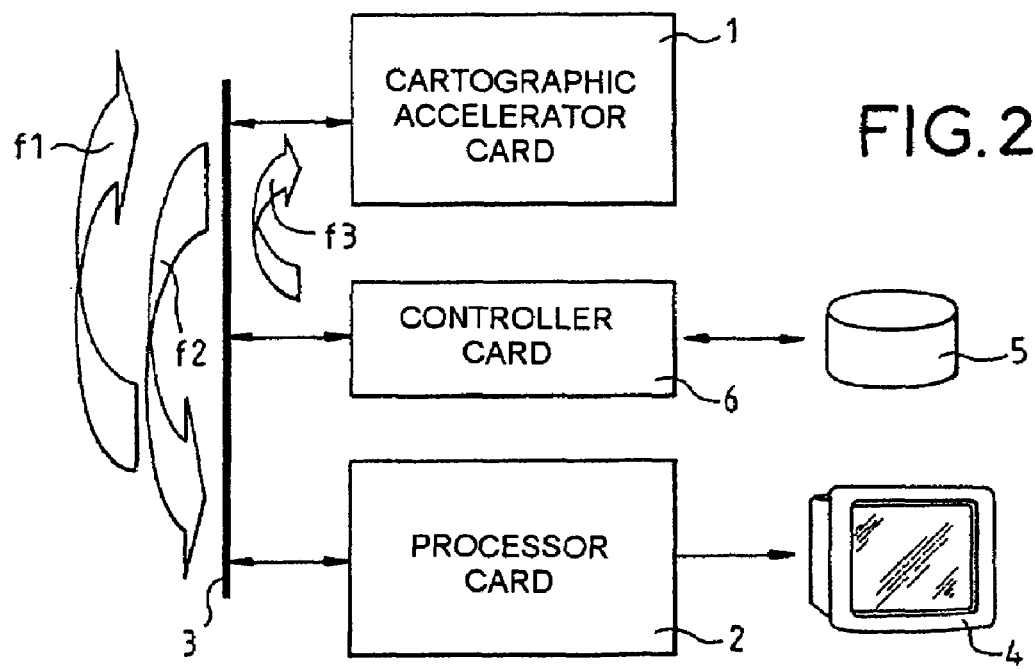
FIG. 2 diagrammatically represents a second exemplary cartographic system incorporating the cartographic accelerator card which implements the method according to the invention.

FIG. 2 diagrammatically represents a second exemplary cartographic system incorporating the cartographic accelerator card which implements the method according to the invention. The cartographic system comprises a cartographic accelerator card 1, a processor card 2, a bus 3, a display screen 4, a cartographic database 5, a controller card 6. The bus 3 is preferably a PCI bus. The controller card 6 extracts cartographic data from the cartographic database 5 so as to place them on the bus 3 in a data stream f3. The processor card 2 groups together parameters of the flight of the aircraft and parameters of the man-machine interface so as to place them on the bus 3 in a data stream f1. The cartographic accelerator card 1 reads the data of the stream f1 and the data of the stream f3 which travel over the bus 3. The cartographic accelerator card 1 uses the data of the stream f1 and the data of the stream f3 that are taken from the bus 3 to carry out the synthesis of a cartographic image. The cartographic accelerator card 1 dispatches the cartographic image over the bus 3 in a data stream f2. The processor card 2 reads from the bus 3 the cartographic image of the stream f2 so as to dispatch it to the display screen 4. The display screen 4 displays the cartographic image which can thus be viewed by the pilot of the aircraft for example.

The cartographic accelerator card carries out both a management function and a cartographic function.

The management function comprises a task of reception of the cartographic data from the cartographic database 5 in compressed form by the bus 3, a task of decompression of said cartographic data, a task of storage of said cartographic data in a terrain memory, a task of calculating the parameters of the flight of the aircraft and of managing the parameters originating from the man-machine interface, a task of transmission of said parameters to the cartographic function, a task of supplying the data stored in the terrain memory to the cartographic function, a task of reception of the cartographic image generated by the cartographic function, a task of storage of the cartographic image in a target memory, a task of transmission of said cartographic image by the bus to the processor card.

The cartographic function comprises a task of separation of the cartographic data emanating from the terrain memory into altitude data, possibly into information cues regarding presence of a forest zone for the pixels concerned, possibly into information cues regarding presence of at least one intervisibility zone for the pixels concerned, possibly into planimetry information cues for the pixels concerned, a task of interpolation of the data and information cues to the current pixel producing in particular a planimetric color image, a task of processing of the altitude data by a shading algorithm so as to generate at each pixel a shading coefficient corresponding to the luminance exhibited by the cartographic image with a given illumination model, another task of processing, executed in parallel with the previous one, of the altitude data so as to generate an anticollision or hypsometric coloration image, a task of synthesis of a color altimetric image by combination, at each pixel of the altimetric image, of the anticollision or hypsometric coloration with on the one hand the possible cue regarding presence of a forest zone and on the other hand the possible cue regarding presence of at least one intervisibility zone, a task of modulation, at each pixel, by the shading coefficient either of the altimetric image or of the planimetric image, a task of mixing of the two images, altimetric and planimetric, one of them being modulated by the shading coefficient and the other not, so as to generate a cartographic image. Advantageously, the cartographic function allows the synthesis of a profile cartographic image representing the terrain in section and being displayable either horizontally or vertically. The cartographic function is preferably carried out with the aid of an Electrically Programmable Logic Device (EPLD), of four queue stacks of FIFO type (standing for "first in first out") and of a palette of colors.

The cartographic function comprises several types of mode of operation, including on the one hand the hypsometric mode types and the anticollision mode types, on the other hand the normal mode types and the inverted mode types. A particular mode is obtained by crossing mutually compatible types of mode. The particular modes thus obtained are therefore the normal anticollision mode, the normal hypsometric mode, the inverted anticollision mode, the inverted hypsometric mode.

Figure 3:
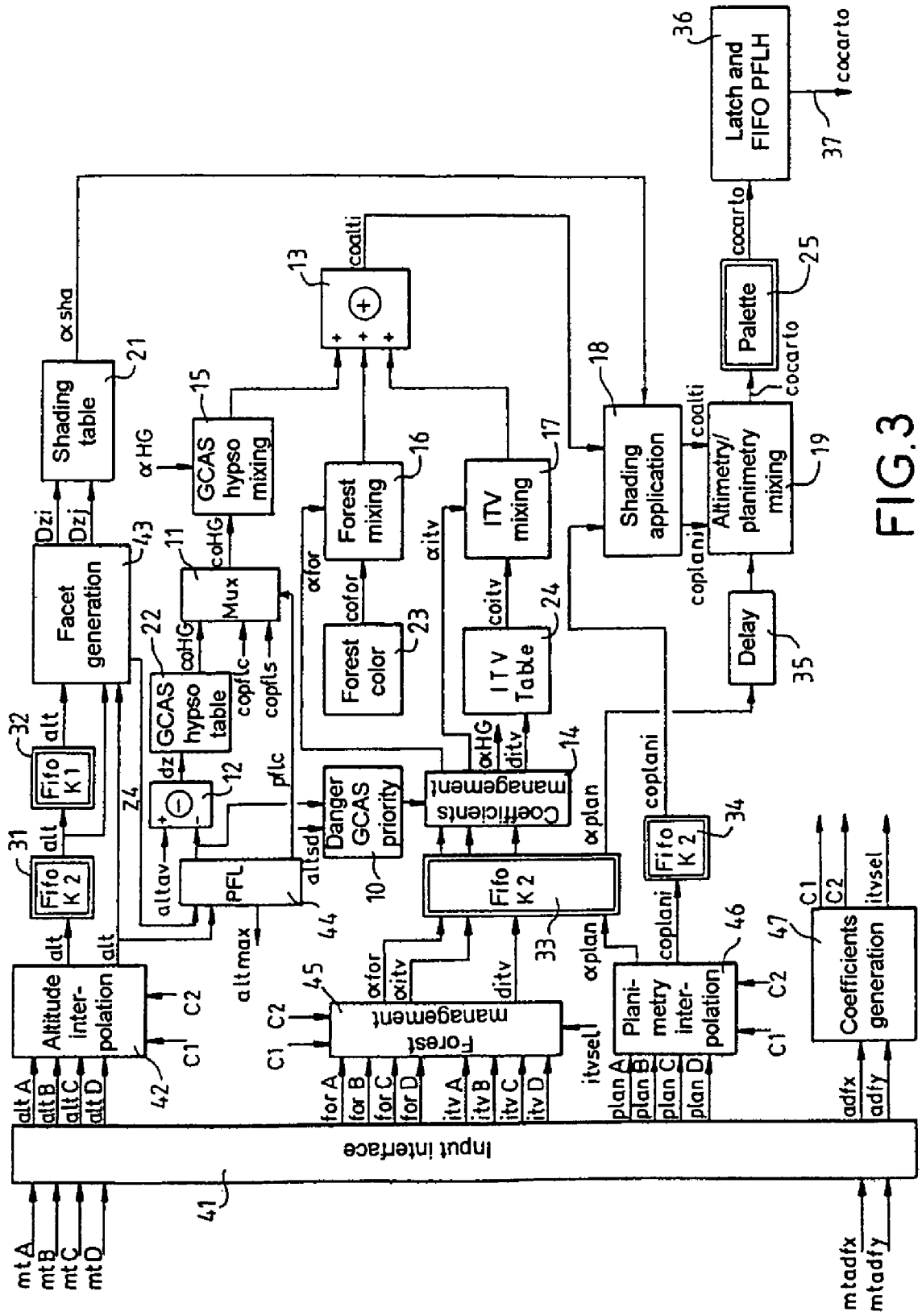
FIG. 3 diagrammatically represents the set of functional blocks of the cartographic function of the cartographic accelerator card, as well as their interrelations, among which blocks are the functional blocks implemented by the method according to the invention.

FIG. 3 diagrammatically represents the set of functional blocks of the cartographic function of the cartographic accelerator card, as well as their interrelations, among which blocks are the functional blocks implemented by the method according to the invention. The functional blocks embodied by the EPLD are surrounded by a single outline whereas the queue stacks and the palette which are structurally distinct components of the EPLD are surrounded by a double outline.

The task of separation of the cartographic data emanating from the terrain memory into altitude data, possibly into information cues regarding presence of a forest zone for the pixels concerned, possibly into information cues regarding presence of at least one intervisibility zone for the pixels concerned, possibly into planimetry information cues for the pixels concerned, is carried out by an input interface block 41.

The task of interpolation of the data and the information cues to the current pixel P is carried out by an altitude interpolation block 42, a block 45 for management of the forest and of the intervisibility (the intervisibility is represented in FIG. 3 by the initials ITV for reasons of congestion in FIG. 3) and a planimetry interpolation block 46.

The task of processing of the altitude data by a shading algorithm so as to generate at each pixel a shading coefficient corresponding to the luminance of the cartographic image with a given illumination model is carried out by the facet generation block 43 and by the shading table 21. This shading algorithm allows the simultaneous display of the macroreliefs and of the microreliefs of the terrain overflown by the aircraft. The macroreliefs correspond to the general disposition of the relief of the terrain overflown by the aircraft. The microreliefs correspond to markedly smaller differences in relief, for example some ten meters, but which are sufficient to be able to shelter potential threats such as for example a ground-to-air missile system or an enemy helicopter. This simultaneous displaying of the macroreliefs and of the microreliefs is particularly beneficial in the case where the aircraft in which the cartographic system containing the cartographic accelerator card is implemented is a military helicopter.

The task of processing of the altitude data so as to generate an anticollision or hypsometric coloration image is carried out by a subtractor 12, an anticollision or hypsometric table 22, a multiplexer 11 and an anticollision or hypsometric mixing block 15. The task of processing of the possible information cues regarding presence of a forest zone, so as to generate a forest image, is carried out by a forest color register 23 and a forest mixing block 16. The task of processing of the possible information cues regarding presence of at least one zone of direct or indirect intervisibility with at least one potential threat given or otherwise, a given potential threat signifying a known potential threat held in the database, so as to generate an intervisibility image, is carried out by an intervisibility table 24 and an intervisibility mixing block 17.

The task of synthesis of a color altimetric image by combination, at each pixel of the altimetric image, of the anticollision or hypsometric coloration with on the one hand the possible cue regarding presence of a forest zone and on the other hand the possible cue regarding presence of at least one intervisibility zone, that is to say the pixel-by-pixel combination of the anticollision or hypsometric coloration image, of the possible forest image and of the possible intervisibility image, is carried out by the coefficients management block 14, the priority to danger anticollision block 10 and the adder 13.

The task of modulation, at each pixel, by the shading coefficient either of the altimetric image or of the planimetric image is carried out by the shading application block 18. The task of mixing of the two images, altimetric and planimetric, one of them being modulated by the shading coefficient and the other not, so as to generate a cartographic image, is carried out by the altimetry/planimetry mixing block 19.

The option consisting in the carrying out of a synthesis of a profile cartographic image representing the terrain in section and displayable either horizontally or vertically requires the use of the profile block 44 (PFL standing for "profile" in FIG. 3) and of the block 36 "Latch & FIFO PFLH".

The desired colorimetric rendition of the cartographic image is catered for by the palette 25 which is preferably an SRAM. Some of the various delay functions necessary for the execution of the various tasks of the cartographic function are catered for by four queue stacks 31 to 34 and by a delay block 35. The calculation of the interpolation coefficients used by the blocks 42, 45 and 46 is carried out by the interpolation coefficients generation block 47.

Each of the various functional blocks of the cartographic function, represented by an outline in FIG. 3, will now be described in detail, in its preferred mode of implementation. Each of said functional blocks receives, for each pixel of the cartographic image to be generated, said pixel being called the current pixel, originating from outside the cartographic function, from one or more other functional blocks of the cartographic function, a set of input parameters and sends out from the cartographic function, from one or more other functional blocks of the cartographic function, a set of output parameters. The control parameters allowing correct and tailored operation of the various functional blocks are not described in the subsequent text, except for a particular case, for reasons of clarity, simplicity and conciseness. These control parameters are mostly conventional.

The input interface block 41 receives, originating from outside the cartographic function, here originating from the terrain memory associated with the function managing the cartographic accelerator card, the input parameters mtA, mtB, mtC, mtD, mtadfx and mtadfy. The input parameters mtA, mtB, mtC and mtD contain various data and information relating to the points A, B, C and D respectively. The input parameters mtA, mtB, mtC and mtD are coded on 16 bits and dispatched to the input interface block 41 at a frequency of 64 MHz. The points A, B, C and D are the points corresponding to the pixels of the terrain memory which are closest to the point P of the target memory, which point P corresponds to the current pixel of the cartographic image to be generated. The point P emanates from the four points A, B, C and D through a conventional transformation which is not the subject matter of the present patent application and which will therefore not be described in greater detail. The quadruple of points A, B, C and D is associated with the point P and each current pixel is therefore associated with a "current" quadruple different from the others. The operations carried out on the points A, B, C and D, such as for example the interpolation operations, must be carried out for each current pixel, that is to say for each of the pixels of the image considered. The input parameters mtadfx and mtadfy contain fractional parts of the terrain memory access addresses which respectively represent the Cartesian coordinates of the point P in the portion of plane defined by the points A, B, C and D.

On the basis of the input parameters mtA, mtB, mtC and mtD, the input interface block 41 extracts the output parameters altA, altB, altC and altD which are the respective altitudes of the points A, B, C and D, and dispatches them to the altitude interpolation block 42. The output parameters altA, altB, altC and altD are coded on 10 bits and dispatched to the altitude interpolation block 42 at a frequency of 16 MHz.

Likewise, from the input parameters mtA, mtB, mtC and mtD, the input interface block 41 extracts the output parameters forA, forB, forC and forD which each respectively contain a cue regarding presence of a forest zone respectively for the points A, B, C and D, that is to say which contain a cue regarding presence of a forest zone for the points corresponding to terrain portions actually covered by forest, and dispatches them to the forest and intervisibility management block 45. The output parameters forA, forB, forC and forD are coded on 1 bit only, one of the values of the bit conveying a cue regarding presence of a forest zone and the other value of the bit corresponding to an absence of forest zone, and are dispatched to the forest and intervisibility management block 45 at a frequency of 16 MHz. In the subsequent determination of priorities between various information cues, only the value of the bit conveying a cue regarding presence of a forest zone is taken into account, the value of the bit corresponding to an absence of forest zone being considered to be an absence of cue regarding presence of a forest zone, which cue is then considered to be nonexistent, the cue of priority immediately lower than the cue regarding presence of a forest zone possibly then being taken into account on condition of course that no other cue of higher priority than the priority of a cue regarding presence of a forest zone exists.

Again on the basis of the input parameters mtA, mtB, mtC and mtD, the input interface block 41 extracts the output parameters itvA, itvB, itvC and itvD which each possibly contain a cue regarding presence of at least one zone of direct or indirect intervisibility between the aircraft and a possibly given potential threat, that is to say one which is known, respectively, for the points A, B, C and D, that is to say which contain a cue regarding presence of at least one zone of intervisibility for the points corresponding to terrain portions actually exhibiting an intervisibility with at least one threat, and dispatches them to the forest and intervisibility management block 45. The output parameters itvA, itvB, itvC and itvD are coded on 5 bits and dispatched to the forest and intervisibility management block 45 at a frequency of 16 MHz. Just as for the cue regarding presence of a forest zone, in the subsequent determination of priorities between various cues, only the combinations of values of the bits conveying a cue regarding presence of at least one intervisibility zone are taken into account, the combinations of values of the bits corresponding to an absence of intervisibility zone being considered to be an absence of cue regarding presence of at least one intervisibility zone, which cue is then considered to be nonexistent, the cue of immediately lower priority than the cue regarding presence of at least one intervisibility zone possibly then being taken into account on condition of course that no other cue of higher priority than the priority of a cue regarding presence of at least one intervisibility zone exists.

Still on the basis of the input parameters mtA, mtB, mtC and mtD, the input interface block 41 extracts the output parameters planA, planB, planC and planD which each possibly contain a cue of planimetry respectively for the points A, B, C and D, that is to say which contain either always a cue of planimetry in the case where the planimetric part of the database is of the digitized paper map type (whether or not there actually is a planimetric element at the pixel considered) or a cue of planimetry only if there is actually a planimetry element at the pixel considered in the case where the planimetric part of the database is of the vector type, and dispatches them to the planimetry interpolation block 46. The output parameters planA, planB, planC and planD are coded on 16 bits and dispatched to the planimetry interpolation block 46 at a frequency of 16 MHz. For each of the points A, B, C and D, the set of input parameters is coded on 16 bits and arrives at the input interface block 41 at a frequency of 64 MHz while the set of output parameters is coded on 32 bits and departs from the input interface block 41 at a frequency of 16 MHz.

On the basis of the input parameters mtadfx and mtadfy which are coded on 5 bits and which arrive at the frequency of 64 MHz at the input interface block 41, the input interface block 41 extracts the output parameters adfx and adfy which are coded on 5 bits and which are dispatched to the block 47 for generating the interpolation coefficients at the frequency of 16 MHz. The output parameters adfx and adfx contain fractional parts of the terrain memory access addresses which respectively represent the Cartesian coordinates of the point P in the portion of plane defined by the points A, B, C and D, since the point P situated in the target memory is obtained through a transformation of the points A, B, C and D, situated in the terrain memory.

The block 47 for generating the interpolation coefficients receives from the input interface block 41 the input parameters adfx and adfy at the frequency of 16 MHz. The block 47 for generating the interpolation coefficients computes, on the basis of the input parameters adfx and adfy, output parameters C1 and C2 which will then be used by the altitude interpolation block 42, by the planimetry interpolation block 46 and possibly by the forest and intervisibility management block 45. The output parameters C1 and C2 are dispatched at the frequency of 32 MHz and in fact convey the values of four bilinear interpolation coefficients, a pair of bilinear interpolation coefficients dispatched at each clock tick allowing the dispatching of the batch of four coefficients to the blocks 42, 45 and 46, at a half-frequency equal to 16 MHz, which frequency is also the frequency of reception of the other input parameters by said blocks 42, 45 and 46. The four bilinear interpolation coefficients are (16-adfx) (16-adfy), (adfx) (16-adfy), (16-adfx) (adfy) and (adfx) (adfy), respectively associated with the points A, B, C and D.

The block 47 for generating the interpolation coefficients also computes, on the basis of the input parameters adfx and adfy, an output parameter itvsel which may later possibly be used by the forest and intervisibility management block 45. The parameter itvsel indicates on 2 bits which, out of the points A, B, C and D, is the closest neighbor of the point P representing the current pixel, when the terrain memory and the target memory are superimposed.

The altitude interpolation block 42 receives from the input interface block 41 the input parameters altA, altB, altC and altD, and receives from the block 47 for generating the interpolation coefficients the input parameters C1 and C2 containing the bilinear interpolation coefficients. On the basis of the various input parameters, the block 42 computes the output parameter alt which is the altitude of the point P, that is to say the altitude of the current pixel, with the aid of the following formula:

$$alt = \frac{[(16 - adfx) \cdot (16 - adfy) \cdot altA + adfx \cdot (16 - adfy) \cdot altB + (16 - adfx) \cdot adfy \cdot altC + adfx \cdot adfy \cdot altD]}{256}$$

The result of the above computation, the altitude alt of the point P, is coded on 12 bits, namely 10 integer part bits and 2 fractional part bits.

To render the impression of relief on the screen, in a so-called 2D5 image, the procedure used consists in modifying the brightness of the current pixel of the image considered as a function of the local slope of the terrain at the level of said current pixel. To do this, an illumination model with one or more light sources is used. The model advantageously adopted uses two light sources, a point source situated at the top left of the display screen and a diffuse uniform source situated underneath the plane of the display screen. Thus the illumination received by the current pixel reflects the local slope of the terrain at the level of the current pixel. The generation of a facet representative of the local slope at the level of the current pixel is carried out by the facet generation block 43 while the correspondence between the facet representative of the local slope of the terrain at the level of the current pixel and the brightness of said current pixel is effected by the shading table 21. The facet is generated with the aid of the altitudes of four pixels situated around the current pixel, the proximity of the relative neighborhood between, on the one hand, these four pixels and, on the other hand, the current pixel being variable and dependent on the value of any zoom onto a part of the image.

Figure 4:
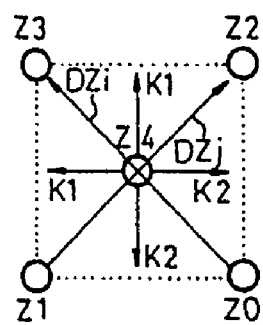
FIG. 4 diagrammatically represents the relative positions and the altitudes of a current pixel and of pixels situated around the current pixel.

The facet generation block 43 receives from the altitude interpolation block 42 the input parameter alt, from the altitude interpolation block 42 by way of the queue stack 31 the input parameter alt delayed by around K2 lines, from the altitude interpolation block 42 by way of the queue stack 31 and of the queue stack 32 the input parameter alt delayed by around K2+K1 lines. The factor K1+K2 is chosen to be close to the value of the image zoom possibly requested by the pilot of the aircraft or by any other operator, the value of this zoom being able to vary for example from around 1 (unit zoom corresponding in fact to an unzoomed image) to 8. The values of K1 and of K2 which are integer values are chosen advantageously in such a way as to be as close as possible to one another. As a function of the value of the zoom, K2 varies from 1 to 4 and K1 from 0 to 4. With the aid of two queue stacks integrated into the block 43, which queue stacks are then shift registers contained in the facet generation block 43 and each having a length of a few points, as well as with the aid of the queue stacks 31 and 32 respectively having a length of around K2 lines and of around K1 lines, the facet generation block 43 can, at any moment, be furnished with the altitudes Z0 to Z4 of five points whose precise relative positions are represented diagrammatically in FIG. 4. The altitude Z4 is one of the output parameters from the facet generation block 43.

The points with altitudes Z0 to Z3 form the four vertices of a square. The points with altitudes Z0 and Z1 are on the same line and have a gap of K1+K2 columns. The points with altitudes Z1 and Z3 are on the same column and have a gap of K1+K2 lines. The points with altitudes Z3 and Z2 are on the same line and have a gap of K1+K2 columns. The points with altitudes Z2 and Z0 are on the same column and have a gap of K1+K2 lines. The point with altitude Z4 has a gap of K1 lines and K1 columns with the point with altitude Z3, a gap of K2 lines and K2 columns with the point with altitude Z0, a gap of K1 lines and K2 columns with the point with altitude Z2, a gap of K2 lines and K1 columns with the point with altitude Z1. The point with altitude Z4 is therefore situated on the two diagonals of the square, namely on the diagonal interconnecting the points with altitude Z3 and Z0 and on the diagonal interconnecting the points with altitude Z2 and Z1.

The facet at the point with altitude Z4 is determined by the slopes of the two diagonals of the square and, more precisely, by two differences in altitude, the altitude difference DZ30 between the points with altitude Z3 and Z0 on the one hand and the altitude difference DZ21 between the points with altitude Z2 and Z1 on the other hand. The following equalities are satisfied:

$$DZ30=Z3-Z0 \text{ and } DZ21=Z2-Z1$$

In fact the values DZ30 and DZ21 thus obtained which are coded on 12 bits, namely 10 integer part bits and 2 fractional part bits, are then saturated on 5 bits. The respective correspondence between the weights of the bits of the result on 12 bits and the weights of the bits of the saturated value on 5 bits is variable and depends on the value of the scale of the image and on the value of the zoom which may possibly be applied to a part of the image. This saturation limits the maximum representable slope and therefore prevents accurate representation of cliffs, but in practice this is no impediment to the pilot who on the one hand encounters few genuine cliffs and on the other hand nevertheless has a fairly close idea thereof by way of the maximum value of saturation corresponding to a slope of around sixty degrees. The values DZ30 and DZ21 are coded on 5 bits and therefore lie between −16 and +15. In order to have positive values only, the value 16 is then added respectively to DZ30 and DZ21 to give the values DZi and DZj respectively. The following equalities are satisfied:

$$DZi=16+Z3-Z0 \text{ and } DZj=16+Z2-Z1$$

The values DZi and DZj thus obtained which are output parameters from the facet generation block 43 and which are representative of the facet at the level of the current pixel, and consequently of the local slope at the level of said current pixel, constitute the two input parameters of the shading table 21 whose output parameter is the shading coefficient αsha which is representative of the brightness of the current pixel considered.

The shading table 21 is a lookup table, the pair of values DZi and DZj (which are saturated) of which constitutes an address whose content then constitutes the sought-after shading coefficient αsha. The shading table 21 comprises 1024 addresses corresponding to the 32×32 possible values of the pair of values DZi and DZj. The addresses are coded in such a way that the following equality is satisfied:

$$\text{address(pixel·current)}=32DZj+DZi$$

The shading coefficient αsha obtained with the aid of the shading table 21 is coded on 7 bits, its value therefore varies from 0 corresponding to a brightness of the current pixel equal to 0% (totally unilluminated point, its color therefore turns black) to 64 corresponding to a brightness of the current pixel equal to 100% (fully illuminated point, its brightness is not modified and its original color is not darkened). The shading table 21 is programmed by software. The set of values of the shading table 21 is recomputed and reprogrammed with each change of scale of the cartographic image, which change brings about a modification of the values loaded into the terrain memory, as well as with each change of the value of the zoom, which change brings about no modification of the values loaded into the terrain memory. A simple modification of the heading of the aircraft does not modify the content of the shading table 21.

The forest and intervisibility management block 45 receives, from the input interface block 41, the input parameters which are forA, forB, forC and forD, each coded on 1 bit, on the one hand, and itvA, itvB, itvC and itvD, coded on 5 bits, on the other hand, from the block 47 for generating the coefficients, the input parameters C1 and C2 and possibly the input parameter itvsel. The output parameters from the forest and intervisibility management block 45 are, for each current pixel, the forest coefficient αfor and the intervisibility coefficient αitv, both coded on 5 bits, as well as a datum of intervisibility ditv at the level of said current pixel.

The input parameters itvA, itvB, itvC and itvD each contain a possible cue regarding presence of at least one intervisibility zone. More precisely, the input parameters itvA, itvB, itvC and itvD respectively contain the parameters pitvA, pitvB, pitvC and pitvD coded on one bit, their value one signifying the presence of at least one intervisibility zone at the pixel considered, A, B, C or D, and their value zero signifying the absence of any zone of intervisibility at the pixel considered, A, B, C or D. At the global level of a complete image, intervisibility may be validated or nonvalidated. If intervisibility is nonvalidated, then the intervisibility coefficient αitv equals zero uniformly for the entire image considered. If intervisibility is validated, then the intervisibility coefficient αitv is given, at the level of each current pixel, by the following formula:

$$\alpha itv = \frac{[(16-adfx)\cdot(16-adfy)\cdot pitvA + adfx\cdot(16-adfy)\cdot pitvB + (16-adfx)\cdot adfy\cdot pitvC + adfx\cdot adfy\cdot pitvD]}{256}$$

The contours of an intervisibility zone are the limits between a zone of presence of intervisibility corresponding for example to a given threat and a zone of absence of said intervisibility. The pixels belonging to said contours risk having values pitvA, pitvB, pitvC and pitvD which are not all identical, thereby giving an intervisibility coefficient αitv lying strictly between zero and one. This risk becomes definite for the pixels belonging to the contours of the set of intervisibility zones, since these pixels belong to the contours of at least one intervisibility zone but do not belong to the interior of any intervisibility zone.

The input parameters itvA, itvB, itvC and itvD each contain an intervisibility datum, respectively ditvA, ditvB, ditvC and ditvD, which may either take the form of a continuous datum on 4 bits, or the form of four binary data relating respectively to four mutually differing potential altitudes of the aircraft. In the case of a continuous datum, the output parameter ditv is given, at the level of each current pixel, by the following formula:

$$ditv = \frac{[(16-adfx)\cdot(16-adfy)\cdot ditvA + adfx\cdot(16-adfy)\cdot ditvB + (16-adfx)\cdot adfy\cdot ditvC + adfx\cdot adfy\cdot ditvD]}{256}$$

In the case of four binary data, by virtue of the coefficient itvsel coded on 2 bits, the closest neighbor, out of the points A, B, C and D, of the point P corresponding to the current pixel is determined and the current pixel's intervisibility datum is a copy of the closest neighbor's intervisibility datum; for example, if A is the closest neighbor of P, then ditv=ditvA.

The input parameters forA, forB, forC and forD each contain a possible cue regarding presence of a forest zone. The input parameters forA, forB, forC and forD are coded on one bit, their value one signifying the presence of a forest zone at the pixel considered, A, B, C or D, and their value zero signifying the absence of forest zone at the pixel considered, A, B, C or D. At the global level of a complete image, the forest may be validated or nonvalidated. If the forest is nonvalidated, then the forest coefficient αfor is uniformly equal to zero for the entire image considered. In the anticollision mode type, the forest is always nonvalidated. If the forest is validated, then the forest coefficient αfor is given, at the level of each current pixel, by the following formula:

$$\alpha for = \frac{[(16-adfx)\cdot(16-adfy)\cdot forA + adfx\cdot(16-adfy)\cdot forB + (16-adfx)\cdot adfy\cdot forC + adfx\cdot adfy\cdot forD]}{256} - \alpha itv$$

the forest coefficient αfor having to lie between zero and one, it is then forced to zero in the case where the above formula gives a negative result.

The contours of a forest zone are the limits between a zone of presence of forest and a zone of absence of forest. The pixels belonging to said contours risk having values forA, forB, forC and forD which are not all identical, thereby giving a forest coefficient αfor lying strictly between zero and one.

The set of output parameters from the forest and intervisibility management block 45 is delayed by around K2 lines by way of a queue stack 33 so that the input parameters of the adder 13 arrive in phase with one another.

The profile block 44 and the multiplexer 11 intervene only in the case of a profile cartographic image, they will as a consequence be described subsequently in this context. In the case of a 2D5 cartographic image, representing a plan view of the terrain, to which has been added a terrain relief cue, said terrain relief cue being represented through the shading coefficient αsha, the profile block 44 merely, in a gradated mode of operation, transmits the altitude Z4 to the input of the subtractor 12 and the multiplexer 11 merely, in a gradated mode of operation, passes the is anticollision or hypsometric coloration image coHG from the output of the anticollision or hypsometric table 22 (denoted Hypso table GCAS in FIG. 3) to the input of the anticollision or hypsometric mixing block 15.

The danger anticollision priority block 10 is active only in the anticollision mode type, it is on the other hand disabled and inactive in the hypsometric mode type. One of the output parameters of the profile block 44 constitutes one of the input parameters of the danger anticollision priority block 10. In the case of a 2D5 cartographic image, this parameter is the altitude Z4. A danger threshold altitude altsd, dependent on the altitude of the aircraft, constitutes the other input parameter of the danger anticollision priority block 10. The danger threshold altitude altsd is determined in such a way that, when the altitude Z4 is greater than the danger threshold altitude altsd, there is either a danger of collision between the terrain and the aircraft in certain cases or a risk of danger of collision between the terrain and the aircraft in other cases which ought to be signaled to the pilot as a priority relative to any other type of information cue. For example in a GCAS kind anticollision mode type (the abbreviation standing for "ground collision avoidance system"), with three colors red, amber and green, danger of collision corresponds to the color red and risk of danger of collision corresponds to the color orange. The collision danger cue corresponds to a definite risk of collision whereas the risk of danger of collision is a safety margin in which the risk is undetermined since it depends on global uncertainties of the system. Generally the danger threshold altitude altsd is chosen equal to the altitude altav of the aircraft. In the case where the altitude Z4 is greater than the danger threshold altitude altsd, the output parameter of the danger anticollision priority block 10 has the effect of modifying the normal operation of the block 14 for managing the coefficients and of compelling this block 14 for managing the coefficients to force the forest coefficient αfor and intervisibility coefficient αitv to zero on the one hand and to force the anticollision or hypsometric coefficient αHG to one; in the converse case, the danger anticollision priority block 10 does not modify the normal operation of the coefficients management block 14. In all cases, the datum of intervisibility ditv at the level of the current pixel, which is an input parameter, is transmitted without modification as output parameter. The normal operation of the coefficients management block 14 consists in transmitting, without modification, as output parameters the forest coefficient αfor and intervisibility coefficient αitv received as input parameters, and of calculating the anticollision or hypsometric coefficient αHG as a function of the forest coefficient αfor and intervisibility coefficient αitv through the following formula: αHG=1−αfor−αitv. The manner of determining the various coefficients αHG, αfor and αitv, as well as the presence of the block 10, define an order of priority of the various cues participating in the construction of the altimetric image.

For the formulation of an anticollision or hypsometric coloration image, two types of mode of operation are possible, the hypsometric mode type generating a hypsometric coloration image and the anticollision mode type generating an anticollision coloration image, for example of GCAS type.

In the hypsometric mode type, the color of the hypsometric coloration image is a function of the absolute altitude of the terrain and goes from green to red ochre as for standard paper maps of the atlas type. The anticollision or hypsometric table 22 which is a lookup table similar to the shading table 21 is loaded with values corresponding to the hypsometric coloration. The subtractor 12 therefore does not intervene, it merely forwards the altitude Z4 of the current pixel to the input of the anticollision or hypsometric table 22, which table 22 outputs a hypsometric coloration coHG for the current pixel, the set of hypsometric colorations coHG for all the current pixels constituting the hypsometric coloration image. The anticollision or hypsometric mixing block 15 receives as input parameters the hypsometric coloration coHG of the current pixel originating from the multiplexer 11 and the anticollision or hypsometric coefficient αHG originating from the coefficients management block 14. The anticollision or hypsometric mixing block 15 carries out the modulation, pixel by pixel, of the hypsometric coloration coHG of the current pixel by the anticollision or hypsometric coefficient αHG of the current pixel, said modulation consisting of a product between the hypsometric coloration coHG and the anticollision or hypsometric coefficient αHG.

In the anticollision mode type, the color of the anticollision coloration image is a function of the relative altitude of the terrain, that is to say of the difference in altitude between the aircraft and the terrain, and is manifested for example by the standard GCAS (standing for "Ground Collision Avoidance System") coloration which comprises the colors red, amber and green. The color green, which is a safety color, is associated with the portions of terrain whose altitude is without any doubt less than that of the aircraft. The color red, which is a danger color, is associated with the portions of terrain whose altitude is without doubt greater than that of the aircraft, which would give rise to a crash should said aircraft overfly said portions of terrain. The color amber is another color which, in view of the uncertainties inherent in the cartographic system as a whole, is associated with the portions of terrain for which a crash is possible but not definite in case of overflight, this in fact being a sort of safety margin. The anticollision or hypsometric table 22 which is a lookup table similar to the shading table 21 is loaded with values corresponding to the anticollision coloration. The subtractor 12 intervenes and carries out the subtraction between the altitude altav of the aircraft and the altitude Z4 of the current pixel, the result dz of the subtraction being output and fed into the input of the anticollision or hypsometric table 22, which table 22 outputs an anticollision coloration coHG for the current pixel, which coloration coHG is for example one of the colors of the standard GCAS coloration, the set of anticollision colorations for all the current pixels constituting the anticollision coloration image. The anticollision or hypsometric mixing block 15 receives as input parameters the anticollision coloration coHG of the current pixel originating from the multiplexer 11 and the anticollision or hypsometric coefficient αHG of the current pixel originating from the coefficients management block 14. The anticollision or hypsometric mixing block 15 carries out the modulation, pixel by pixel, of the anticollision coloration coHG of the current pixel by the anticollision or hypsometric coefficient αHG of the current pixel, said modulation consisting of a product between the anticollision coloration coHG and the anticollision or hypsometric coefficient αHG.

A forest color cofor is contained in a forest color register 23. The forest mixing block 16 carries out the modulation, pixel by pixel, of the forest color cofor (common to all the pixels) by the forest coefficient αfor of the current pixel, said modulation consisting of a product between the forest color cofor and the forest coefficient αfor. The formula for computing the forest coefficient αfor makes it possible to carry out a smoothing of the contour of the forest zones, which smoothing removes the "staircase" effects which are a particular impediment essentially in dynamic mode. The order of the priorities between the various cues participating in the construction of the altimetric image is consequently no longer strictly satisfied for the pixels belonging to the contours of a zone of presence of forest.

The forest color intervenes only in the hypsometric mode type, since in anticollision mode type the forest is nonvalidated and consequently the forest coefficient αfor is forced to zero for the entire image considered.

The intervisibility table 24 which is a lookup table similar to the shading table 21 is loaded with values corresponding to the intervisibility datum type ditv available on its input which may be either a continuous datum on 4 bits or a quadruple of binary data. In the case of a continuous datum on 4 bits, the value of said datum may go from a danger extreme value related to a definite presence of at least one intervisibility zone to a safety extreme value related to the certainty of absence of intervisibility zone in the threat range zone considered in the case of indirect intervisibility or in the aircraft's visibility sector in the case of direct intervisibility; the colors respectively associated with said values go from the danger plain color to the safety plain color, passing through a gradation of plain intermediate colors, each gradation being closer to or further from one of the extreme colors depending on whether the probability of presence of at least one intervisibility zone is higher or lower. In the case of a quadruple of binary data, the result supplied by the intervisibility table 24 depends only on the binary datum corresponding to the actual altitude of the aircraft or as the case may be only on the two binary data flanking the actual altitude of the aircraft. When said result depends only on the two binary data flanking the actual altitude of the aircraft, and when the two data are different, it is the datum regarding presence of at least one intervisibility zone corresponding to the danger plain color which has priority and which is consequently the only one adopted. The intervisibility table 24 is programmed by software like the other lookup tables. The intervisibility datum ditv of the current pixel arrives at the input of the intervisibility table 24, which table 24 outputs an intervisibility coloration coitv for the current pixel, the set of intervisibility colorations for all the pixels constituting the intervisibility image. The intervisibility coloration is either a danger plain color, for example red, for the zones of presence of at least one intervisibility zone, or a safety plain color, for example green, for a range zone of at least one threat including no intervisibility zone in certain cases or for the aircraft's visibility sector in other cases, the parts of the intervisibility image which are situated outside all the previous zones are considered to be empty, no coloration being assigned to them. A plain color covering the entire part of the image that it represents is unlike the colored textures of the prior art in grid form, the grid of which covers only a part of the zone of the image that the texture represents. The intervisibility mixing block 17 receives as input parameters the intervisibility coloration coitv of the current pixel and the intervisibility coefficient αitv of the current pixel, both originating from the coefficients management block 14. The intervisibility mixing block 17 carries out the modulation, pixel by pixel, of the intervisibility coloration coitv of the current pixel by the intervisibility coefficient xitv of the current pixel, said modulation consisting of a product between the intervisibility coloration coitv and the intervisibility coefficient αitv. The formula for computing the intervisibility coefficient αitv makes it possible to carry out a smoothing of the contour of the intervisibility zones, which smoothing removes the "staircase" effects which are a particular impediment essentially in dynamic mode. The order of the priorities between the various cues participating in the construction of the altimetric image is consequently no longer necessarily strictly satisfied for the pixels belonging to the contours of a zone of presence of intervisibility. The intervisibility coloration intervenes both in the hypsometric mode type and in the anticollision mode type (except of course when requested otherwise by the pilot through the man-machine interface which may invalidate intervisibility such as forest globally at the level of any image).

The adder 13 carries out the addition, pixel by pixel, between its three input parameters which are respectively the output parameter from the anticollision or hypsometric mixing block 15, namely the modulated anticollision or hypsometric coloration, the output parameter from the forest mixing block 16, namely the modulated forest color, the output parameter from the intervisibility mixing block 17, namely the modulated intervisibility coloration. The result of this addition constitutes at each pixel the altimetric cue also called the altimetric color, the set of altimetric cues of all the pixels constituting the altimetric image. The altimetric color is coded on 18 bits, 6 bits per color component, red, green and blue.

The planimetry interpolation block 46 receives, originating from the input interface block 41, the input parameters which are planA, planB, planC and planD, each coded on 16 bits, and representing, respectively at the level of the points A, B, C and D, conventional planimetry elements such as for example roads, rivers and lakes, networks, aeronautical zones. The planimetry interpolation block 46 also receives, originating from the coefficients generation block 47, the input parameters C1 and C2. The output parameters from the planimetry interpolation block 46 are, for each current pixel, the planimetry coefficient αplan, coded on 4 bits, as well as a planimetry cue at the level of said current pixel, also called the planimetric color at the level of said current pixel, the set of planimetric cues of all the pixels constituting the planimetric image.

The input parameters planA, planB, planC and planD each contain a planimetry coefficient, respectively αpA, αpB, αpC and αpD, which is coded on 4 bits and equals zero in the case of absence of a planimetry element at the point considered. The planimetry coefficient αplan is given, at the level of each current pixel, by the following formula:

$$\alpha plan = \frac{[(16 - adfx) \cdot (16 - adfy) \cdot \alpha pA + adfx \cdot (16 - adfy) \cdot \alpha pB + (16 - adfx) \cdot adfy \cdot \alpha pC + adfx \cdot adfy \cdot \alpha pD]}{256}$$

The input parameters planA, planB, planC and planD also each contain a planimetry datum, respectively dpA, dpB, dpC and dpD, which takes the form of the juxtaposition of three color component data red (RdpA, RdpB, RdpC and RdpD), green (VdpA, VdpB, VdpC and VdpD) and blue (BdpA, BdpB, BdpC and BdpD), each color component being coded on 4 bits. The output parameter, the planimetric color coplani, is coded on 18 bits since it consists of the juxtaposition of three color component data, red Rp, green Vp and blue Bp, each color component being coded on 6 bits, and being given, at the level of each current pixel, by one of the following formulae:

$$Rp = \frac{[(16 - adfx) \cdot (16 - adfy) \cdot RdpA + adfx \cdot (16 - adfy) \cdot RdpB + (16 - adfx) \cdot adfy \cdot RdpC + adfx \cdot adfy \cdot RdpD]}{256}$$

$$Vp = \frac{[(16 - adfx) \cdot (16 - adfy) \cdot VdpA + adfx \cdot (16 - adfy) \cdot VdpB + (16 - adfx) \cdot adfy \cdot VdpC + adfx \cdot adfy \cdot VdpD]}{256}$$

$$Bp = \frac{[(16 - adfx) \cdot (16 - adfy) \cdot BdpA + adfx \cdot (16 - adfy) \cdot BdpB + (16 - adfx) \cdot adfy \cdot BdpC + adfx \cdot adfy \cdot BdpD]}{256}$$

The set of output parameters from the planimetry interpolation block 46 is delayed by around K2 lines by way of two queue stacks 33 and 34 so that said output parameters are in phase with the altimetric cue available at the output of the adder 13.

The input parameters of the shading application block 18 are, for each current pixel, the altimetric cue or altimetric color coalti originating from the adder 13, the planimetric cue or planimetric color coplani originating from the queue stack 34, and the shading coefficient αsha originating from the shading table 21. The shading application block 18 comprises two types of mode of operation. One of the types of mode of operation is the normal mode of operation type in which the shading coefficient αsha modulates the altimetric color coalti but not the planimetric color coplani, the modulation consisting in the carrying out of the product αsha times coalti pixel by pixel, this product becoming the modulated altimetric color coalti, the planimetric color then being transmitted without modification between the input and the output of the shading application block 18. The other type of mode of operation is the inverted mode of operation type in which the shading coefficient αsha modulates the planimetric color coplani but not the altimetric color coalti, the modulation consisting in the carrying out of the product αsha times coplani pixel by pixel, this product becoming the modulated planimetric color coplani, the altimetric color then being transmitted without modification between the input and the output of the shading application block 18. The output parameters from the shading application block 18 are on the one hand coalti, modulated altimetric color in the normal type of operation or unmodulated altimetric color in the inverted type of operation, and on the other hand coplani, unmodulated planimetric color in the normal type of operation or modulated planimetric color in the inverted type of operation.

The altimetry/planimetry mixing block 19 receives as input parameters the colors coalti and coplani originating from the shading application block 18 as well as the planimetry coefficient αplan originating from the block of the queue stack 33 but having later been delayed by the delay block 35 so as to be in phase with the colors coalti and coplani. The mixing between colors coalti and coplani is done, pixel by pixel, with the aid of the planimetry coefficient αplan, the result being the cartographic cue also called the cartographic color cocarto. The mixing law may be of various types. An exemplary mixing law is the so-called normal law the expression for which is the following: cocarto=coplani+(1−αplan)·coalti. Another exemplary mixing law is the so-called $K^2$ law the expression for which is the following: cocarto=αplan·coplani+(1−αplan)·coalti. It is also possible to supplement the various laws with a thresholding of the type cocarto=coplani if the planimetry coefficient αplan exceeds a given threshold. The altimetry/planimetry mixing block 19 can also integrate a lookup table similar to the shading table 21. This lookup table makes it possible to associate a pair of coefficients βalti and βplani, for example coded on 5 bits each, with all the values of the planimetry coefficient αplan, the mixing then being performed according to the following formula: cocarto=βalti·coalti+βplani·coplani, which formula makes it possible to simulate, by way of tailored programming of the lookup table, a good number of mixing laws including nonlinear laws of the threshold-based type. In the weighted combination making it possible to obtain the cartographic cues constituting the cartographic image, the altimetric image considered is streamlined, that is to say at least the following are deleted: the cue regarding presence of a forest zone, the cue of threat range zone or of aircraft visibility sector as the case may be, and the anticollision or hypsometric colorations which represent neither danger of collision nor risk of danger of collision and sometimes even the intervisibility cues, the whole so as to render the reading of the map more efficient for the pilot. A good density/legibility compromise for the information cues displayed is thus achieved. In the case where the planimetric part of the database is of digitized paper map type, when the density of planimetric cues is too rich or when the shading exists too markedly, for the sake of legibility of the map the shading coefficient $\alpha sha$ is disabled, thus modulating neither the planimetric image nor the altimetric image, thus corresponding to a type of mode of operation termed inverted gradated.

Downstream of the altimetry/planimetry mixing block 19 the cartographic color cocarto may be modified at will with the aid of the palette 25 which allows transformation both of the color components and of the luminance or of the contrast of the cartographic image consisting of the set of cartographic colors cocarto of all the pixels. The cartographic color cocarto then passes through the block 36 "latch&fifoPFLH" which in the case of a 2D5 cartographic image places on an output bus 37, destined for the function of managing the cartographic accelerator card for writing to the target memory, the cartographic image with a format and with a frequency which are tailored to the output bus 37. The "latch" function of the block 36 makes it possible to tailor the output bit rate of the pixels of the 2D5 cartographic image or of the vertical profile cartographic image on the output bus 37 which is for example a 32-bit bus. The "fifoPFLH" function of the block 36 to tailor the bit rate on the output bus 37 to the type of scanning of the target memory (vertical then horizontal instead of horizontal then vertical as for the 2D5 or vertical profile cartographic images). This makes it possible to preserve a write to the target memory for a horizontal profile image which is homogeneous with that for a 2D5 or vertical profile cartographic image; specifically, the writing of a vertical profile or 2D5 cartographic image is carried out line by line, while the writing of a horizontal profile cartographic image is carried out double column by double column. When a cartographic image and a profile image have to be displayed on one and the same screen, the cartographic accelerator card computes them and displays them successively in time, periodically, reprogramming all the tables between each computation.

Figure 5:
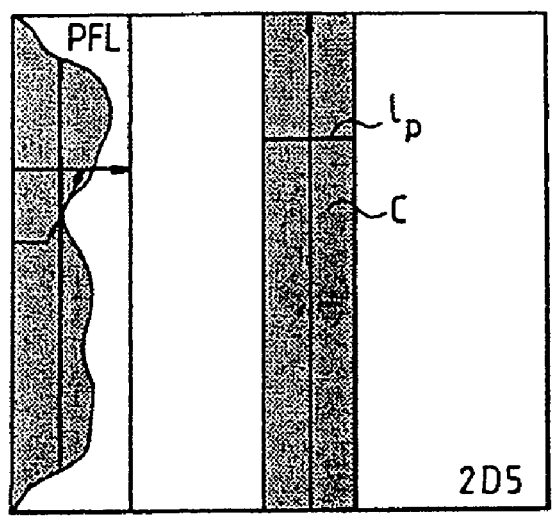
FIG. 5 diagrammatically represents an exemplary on-screen display, of the set consisting of a vertical profile cartographic image and a 2D5 cartographic image, by the cartographic function of the cartographic accelerator card implementing the method according to the invention.
Figure 6:
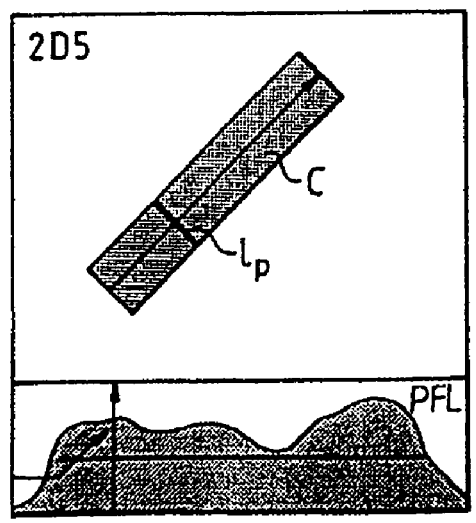
FIG. 6 diagrammatically represents an exemplary on-screen display, of the set consisting of a horizontal profile cartographic image and a 2D5 cartographic image, by the cartographic function of the cartographic accelerator card implementing the method according to the invention.

The profile block 44 and the multiplexer 11 intervene in the case of a profile cartographic image, whether the latter be vertical as in FIG. 5 or horizontal as in FIG. 6, the profile cartographic image then being represented by the initials PFL. This profile cartographic image represents a section through the terrain overflown. The altitude represented in the profile cartographic image preferably corresponds to the upper bound of the altitude of the terrain over a line which belongs to the corridor C and which is perpendicular to the arrow, for example the line lp called the slice of the corridor C, the corridor C being a band of terrain represented by a rectangle in FIGS. 5 and 6, the arrow representing the heading of the aircraft. This profile cartographic image is added to the 2D5 cartographic image, either in the form of a window generally situated on the left of the 2D5 cartographic image in the reference frame of the display screen in the case of a vertical profile cartographic image as in FIG. 5, or in the form of a window generally situated beneath the 2D5 cartographic image in the reference frame of the display screen in the case of a horizontal profile cartographic image as in FIG. 6. In the reference frame of the display screen, the direction of scanning goes in FIG. 5 from left to right for one line then from bottom to top for the various lines, and in FIG. 6 from bottom to top for one column then from left to right for the various columns. The direction of scanning is indicated in FIGS. 5 and 6 by two arrows in the PFL window; the heading of the aircraft is indicated in FIGS. 5 and 6 by an arrow in the 2D5 window. The luminance of the profile cartographic image is constant and consequently independent of the shading coefficient $\alpha sha$, both types of mode, hypsometric and anticollision, remaining possible. No intervisibility, forest or planimetry cue is represented.

In the case of a profile cartographic image, the profile block 44 detects the maximum altitude altmax of the terrain over each slice of the corridor C considered, the pixels of the cartographic image whose altitude is greater than the altitude altmax correspond to the sky and are represented by a color copflc (common to all the pixels) of sky. The pixels of the cartographic image whose altitude is less than the altitude altmax correspond to the terrain and are represented either by a terrain color copfls (common to all the pixels) which is uniform and independent of the altitude of the terrain represented, or by the anticollision or hypsometric coloration in the anticollision or hypsometric mode type, parameters for controlling the multiplexer 11, which are not represented in FIG. 3, allowing the pilot to choose one or other representation. The multiplexer 11 chooses, by way of said control parameters, between the input parameters, coHG, copflc and copfls, that which it will transmit as output destined for the anticollision or hypsometric mixing block 15. The profile block 44 indicates, pixel by pixel, with the aid of the parameter pflc, whether the current pixel corresponds to sky or to terrain depending on whether this current pixel has an altitude greater than or less than the altitude altmax of the corridor C considered. The manner of operation, in the case of a profile cartographic image, of the subtractor 12, of the anticollision or hypsometric table 22, and of the anticollision or hypsometric mixing block 15, are similar to their manner of operation in the case of a 2D5 cartographic image.

The invention claimed is:

1. A zoom method for zooming onto a part of an image which includes pixels and which represents a terrain overflown by an aircraft comprising the steps of:

modulating an image, pixel by pixel, by a shading cue representative of the relief of a terrain, determining said shading cue being by way of a computation carried out, in a reference frame of a display screen of an aircraft, pixel by pixel, on the basis of a altitudes of pixels neighboring the current pixel in the case of the unzoomed image, characterized in that, in the case of an image zoomed with a zoom factor whose value belongs to a given span distinct from the span to which a unit zoom factor belongs, the latter corresponding to an unzoomed image, the shading cue is determined by way of said computation carried out on the basis of the altitudes of pixels which are more remote from the current pixel than the neighboring pixels, by a remoteness factor whose value belongs to said given span.

2. The zoom method as claimed in claim 1, wherein the computation determines the shading cue on the basis of four pixels forming the vertices of a square whose current pixel is the center, the shading cue being obtained on the basis of the difference in altitude between the pixel situated at the top left of the current pixel and the pixel situated at the bottom right of the current pixel and of the difference in altitude between the pixel situated at the top right of the current pixel and the pixel situated at the bottom left of the current pixel.

3. The zoom method as claimed in claim 2, wherein a saturation function is applied to the result of each difference.

4. The zoom method as claimed in claim 1, wherein the shading cue is obtained directly by reading a lookup table with two inputs, one of the inputs receiving the difference in altitude between the pixel situated at the top left of the current pixel and the pixel situated at the bottom right of the current pixel and the other input receiving the difference in altitude between the pixel situated at the top right of the current pixel and the pixel situated at the bottom left of the current pixel.

5. The zoom method as claimed in claim 4, wherein the values of the table are recomputed with each change of scale of an image and with each change of the zoom.

6. The zoom method as claimed in claim 1, wherein the number of bits for coding the altitude differences is less than the number of bits for coding the altitudes, and in that the correspondence between the bits for coding the altitude differences and the bits for coding the altitudes is variable so as to accommodate the variation in the altitude differences as a function of the variation in the remoteness of the pixels entering into the computation of said altitude differences.

7. The zoom method as claimed in claim 6, wherein the value of the scale of an image decreases substantially, the weight of the bit for coding the altitudes corresponding to the least significant bit of the coding of the altitude differences increases.

8. The zoom method as claimed in claim 6, wherein the value of the zoom increases substantially, the weight of the bit for coding the altitudes corresponding to the least significant bit of the coding of the altitude differences decreases.

9. The zoom method as claimed in claim 2, wherein the zoom method uses the abutting succession of four queue stacks of specified lengths in such a way that the altitude of the pixel situated at the bottom right of the current pixel is available at the level of the input of the first queue stack, the altitude of the pixel situated at the bottom left of the current pixel is available between the output of the first queue stack and the input of the second queue stack, the altitude of the current pixel is available between the output of the second queue stack and the input of the third queue stack, the altitude of the pixel situated at the top right of the current pixel is available between the output of the third queue stack and the input of the fourth and last queue stack, the altitude of the pixel situated at the top left of the current pixel is available at the level of the output of the fourth and last queue stack.

10. A cartographic accelerator card, comprising:
  modulation means for modulating an image, pixel by pixel, by a shading cue representative of the relief of a terrain,
  means for determining said shading cue being by way of computing, in a reference frame of a display screen of an aircraft, pixel by pixel, on the basis of a altitudes of pixels neighboring the current pixel in the case of the unzoomed image, characterized in that, in the case of an image zoomed with a zoom factor whose value belongs to a given span distinct from the span to which a unit zoom factor belongs, the latter corresponding to an unzoomed image, the shading cue is determined by way of said computation carried out on the basis of the altitudes of pixels which are more remote from the current pixel than the neighboring pixels, by a remoteness factor whose value belongs to said given span.

11. The cartographic accelerator card as claimed in claim 10, wherein said determining means determines the shading cue on the basis of four pixels forming the vertices of a square whose current pixel is the center, the shading cue being obtained on the basis of the difference in altitude between the pixel situated at the top left of the current pixel and the pixel situated at the bottom right of the current pixel and of the difference in altitude between the pixel situated at the top right of the current pixel and the pixel situated at the bottom left of the current pixel.

12. The cartographic accelerator card as claimed in claim 11, wherein a saturation function is applied to the result of each difference.

13. The cartographic accelerator card as claimed in claim 11, wherein the shading cue is obtained directly by reading a lookup table with two inputs, one of the inputs receiving the difference in altitude between the pixel situated at the top left of the current pixel and the pixel situated at the bottom right of the current pixel and the other input receiving the difference in altitude between the pixel situated at the top right of the current pixel and the pixel situated at the bottom left of the current pixel.

14. The cartographic accelerator card as claimed in claim 13, wherein the values of the table are recomputed with each change of scale of an image and with each change of the zoom.

15. The cartographic accelerator card as claimed in claim 11, wherein the number of bits for coding the altitude differences is less than the number of bits for coding the altitudes, and in that the correspondence between the bits for coding the altitude differences and the bits for coding the altitudes is variable so as to accommodate the variation in the altitude differences as a function of the variation in the remoteness of the pixels entering into the computation of said altitude differences.

16. The cartographic accelerator card as claimed in claim 15, wherein the value of the scale of an image decreases substantially, the weight of the bit for coding the altitudes corresponding to the least significant bit of the coding of the altitude differences increases.

17. The cartographic accelerator card as claimed in claim 15, wherein the value of the zoom increases substantially, the weight of the bit for coding the altitudes corresponding to the least significant bit of the coding of the altitude differences decreases.

18. The cartographic accelerator card as claimed in claim 11, wherein the zoom method uses the abutting succession of four queue stacks of specified lengths in such a way that the altitude of the pixel situated at the bottom right of the current pixel is available at the level of the input of the first queue stack, the altitude of the pixel situated at the bottom left of the current pixel is available between the output of the first queue stack and the input of the second queue stack, the altitude of the current pixel is available between the output of the second queue stack and the input of the third queue stack, the altitude of the pixel situated at the top right of the current pixel is available between the output of the third queue stack and the input of the fourth and last queue stack, the altitude of the pixel situated at the top left of the current pixel is available at the level of the output of the fourth and last queue stack.

* * * * *